(12) United States Patent
Hobdy (10) Patent No.: US 8,836,152 B2
(45) Date of Patent: Sep. 16, 2014

(54) HYDRAULIC WAVE ENERGY CONVERTER WITH VARIABLE DAMPING

(76) Inventor: Miles Hobdy, Fulshear, TX (US)

( * ) Notice: Subject to any disclaimer, the term of this patent is extended or adjusted under 35 U.S.C. 154(b) by 349 days.

(21) Appl. No.: 13/333,450

(22) Filed: Dec. 21, 2011

(65) Prior Publication Data

US 2012/0091709 A1    Apr. 19, 2012

Related U.S. Application Data

(60) Continuation-in-part of application No. 13/193,973, filed on Jul. 29, 2011, now Pat. No. 8,102,065, which is a division of application No. 12/271,743, filed on Nov. 14, 2008, now Pat. No. 8,026,620.

(51) Int. Cl.
*F03B 13/16* (2006.01)
*F03G 7/08* (2006.01)
*F03B 13/20* (2006.01)
*H02P 9/00* (2006.01)

(52) U.S. Cl.
CPC ............... *F03B 13/20* (2013.01); *H02P 9/009* (2013.01); *Y02E 10/38* (2013.01); *F05B 2260/406* (2013.01); *F05B 2220/708* (2013.01); *F03G 7/08* (2013.01)
USPC ............................................. 290/42; 290/53

(58) Field of Classification Search
CPC .......... F03B 13/12; F03B 13/14; F03B 13/22; F03B 13/26
USPC ...................................... 290/42, 53
See application file for complete search history.

(56) References Cited

U.S. PATENT DOCUMENTS

| | | | |
|---|---|---|---|
| 3,696,251 A | 10/1972 | Last et al. | |
| 3,912,938 A * | 10/1975 | Filipenco | 290/53 |
| 4,110,630 A | 8/1978 | Hendel | |
| 4,251,991 A | 2/1981 | Wood | |
| 4,260,901 A * | 4/1981 | Woodbridge | 290/42 |
| 4,266,143 A * | 5/1981 | Ng | 290/53 |
| 4,317,047 A | 2/1982 | de Almada | |
| 4,352,023 A | 9/1982 | Sachs et al. | |
| 4,400,940 A * | 8/1983 | Watabe et al. | 60/502 |
| 4,423,334 A | 12/1983 | Jacobi et al. | |
| 4,492,875 A | 1/1985 | Rowe | |
| 4,580,400 A * | 4/1986 | Watabe et al. | 60/398 |
| 4,748,338 A | 5/1988 | Boyce | |
| 5,461,862 A * | 10/1995 | Ovadia | 60/641.9 |
| 5,512,795 A | 4/1996 | Epstein et al. | |
| 5,947,696 A * | 9/1999 | Baumgarten | 417/233 |
| 6,291,904 B1 | 9/2001 | Carroll | |
| 6,345,789 B1 * | 2/2002 | Rasmusson | 244/171.5 |
| 7,298,054 B2 | 11/2007 | Hirsch | |
| 7,305,823 B2 | 12/2007 | Stewart et al. | |
| 7,352,073 B2 | 4/2008 | Ames | |
| 7,737,569 B2 | 6/2010 | Hench | |
| 7,759,813 B2 * | 7/2010 | Fujisato | 290/53 |
| 2004/0007881 A1 * | 1/2004 | Kobashikawa et al. | 290/53 |
| 2010/0228401 A1 | 9/2010 | Hench | |

* cited by examiner

*Primary Examiner* — Quyen Leung
*Assistant Examiner* — Naishadh Desai
(74) *Attorney, Agent, or Firm* — Egbert Law Offices, PLLC (57) ABSTRACT

A wave energy converter has a shell, a pendulum pivotally positioned in the shell, a pump linked to the pendulum and operable by a movement of the pendulum so as to pump a hydraulic fluid outwardly therefrom, a motor interconnected to the pump such that the hydraulic fluid from the pump causes a rotation of the motor, and an electrical generator connected to the motor such that the rotation of the motor causes the electrical generator to produce electrical energy. A pendulum adjuster can be operatively connected to the pendulum so as to change a center of gravity of the pendulum.

19 Claims, 8 Drawing Sheets

HYDRAULIC WAVE ENERGY CONVERTER WITH VARIABLE DAMPING

CROSS-REFERENCE TO RELATED APPLICATIONS

The present application is a continuation-in-part of U.S. patent application Ser. No. 13/193,973, filed on Jul. 29, 2011, entitled "Wave Energy Converter", presently pending. U.S. patent application Ser. No. 13/193,973 was a divisional of U.S. application Ser. No. 12/271,743, filed on Nov. 14, 2008, entitled "Wave Energy Converter". U.S. patent application Ser. No. 12/271,743 issued on Sep. 27, 2011 as U.S. Pat. No. 8,026,620.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the conversion of mechanical energy to electrical energy. More particularly, the present invention the relates to an apparatus that converts energy provided by waves in a body of water into electricity. More particularly, the present invention relates to wave energy conversion that utilizes hydraulics in association with a pendulum for the production of electrical energy.

2. Description of Related Art Including Information Disclosed Under 37 CFR 1.97 and 37 CFR 1.98.

With rising oil prices, more and more efforts are being made to find alternative energy sources. Alternative energy sources include biomass (such as biodiesel), geothermal energy, solar energy, wind energy, and wave power. Wave power is a form of renewable energy. Therefore, wave power is a very desirable alternative to non-renewable sources, such as oil and coal. The systems that harness the energy of waves are commonly referred to as wave energy converters (WECs). The technology for wave power energy conversion is in the early stages in that much research and development is going into technology relating to the conversion of wave energy to electricity.

A WEC is device that converts the mechanical energy of the waves of a body of water, such as the ocean, into electrical energy. The electrical energy is typically in the form of electricity. The obvious benefit of utilizing the motion of waves for the production of electrical energy is the abundance of ocean waves, the low cost of converting wave energy into electrical energy, extremely low emissions in such conversion, and very little environmental impact of devices that perform such a conversion.

Many attempts to harness wave energy have yielded varying degrees of success. For example, several foreign companies have engineered and fielded new WEC concepts. Most of the companies involved in bringing these various concepts to market are located in Europe where mandates for sustainable renewable energy supplies follow the Kyoto Accord for reduction in carbon emissions. Several European nations are signatories to the Kyoto Accord and therefor have set forth various goals for implementing new power generating technologies, including onshore and offshore wind farms, WECs, and subsea turbine devices utilizing stable ocean and river currents. European nations lead the United States in the pursuit of alternative energies. For example, the Norwegian classification authority (Det Norske Veritas) has guidelines for the design and construction of WECs. Therefore, there is a need for the development of WECs in the United States.

In order to fully maximize the use of wave power, a WEC must adapt to the prevailing wave environment. That is, the apparatus must adapt to the transient amplitude, frequency, and phase of the waves of a body of water. One problem associated with WECs is that to adapt to the transient nature of waves, the apparatus of the WEC must change a mass, stiffness or damping characteristic. Many WECs are not equipped to respond to the changes in waves. The ability of a WEC to respond to transient waves requires additional components and complexity, which further compounds the potential maintenance and reliability issues of a WEC.

Another problem associated with current WECs is that the parts that convert wave energy to electrical energy are exposed directly to the environment. Therefore, these parts are subject to corrosion and disrepair. Thus, there is a need for a WEC that protects the energy-converting parts from the environment.

Various patents have been issued relating to WECs. For example, U.S. Pat. No. 7,305,823, issued on Dec. 11, 2007 to Stewart et al., discloses a wave energy converter having two elements intended to be placed in a body of water. The two elements are able to move relative to each other in response to forces applied to the wave energy converter by the body of water. At least one of the two elements is a wave energy absorber. A mechanism is connected between the two elements so as to extract energy from the wave energy converter for producing output electric energy as a function of the movement between the two elements. Another mechanism is connected between a source of energy and one of the two elements. The mechanism senses and determines the displacement, velocity, and acceleration of one of the two elements relative to the other for selectively and actively supplying energy to one of the two elements so as to cause an increase in the displacement and velocity of one of the two elements relative to the other.

U.S. Pat. No. 6,291,904, issued on Sep. 18, 2001 to Carroll, discloses an open-ended tube that is mounted in a fixed, vertical orientation within a body of water. The top and bottom ends of the tube are positioned at preselected depths relative to an average water level. The tube-top open end is disposed at a first depth approximately equal to, but not less than, the maximum preselected wave amplitude so that the top end is always submerged. The tube-bottom open end is disposed at a depth where the energy level associated with preselected waves of maximum wavelength is small. Water flows into and out of the tube in response to pressure variations caused by passing waves. A piston is disposed within the tube for converting the water flow to useful energy.

U.S. Pat. No. 7,352,073, issued on Apr. 1, 2008 to Ames, discloses an ocean wave energy converter that has a generator with a rotating inner rotor surrounded by a counter-rotating outer rotor for generating electricity. A reciprocating drive rod drives the inner rotor on the downstroke of the drive rod and the outer rotor on the upstroke of the drive rod through a gear-driven driveshaft with clutches. A buoy is attached to an end of the drive rod whereby the undulation of the ocean waves relative to the buoy reciprocates the drive rod between the upstroke and the downstroke positions.

U.S. Pat. No. 7,298,054, issued on Nov. 20, 2007 to Hirsch, discloses a wave energy conversion system that includes a base substantially connected to a wave-medium floor, a tidal platform connected to the base, and a tidal float connected to the tidal platform. An axle is connected to the tidal platform with an inductive coil positioned within the axle such that an axis of the inductive coil is parallel to the axle. A magnetic sleeve includes a magnetic sleeve opening such that the axle passes through the magnetic sleeve opening. A float member is connected to the magnetic sleeve. A moving wave causes displacement of the float member. The float member causes the magnetic sleeve to move relative to the inductive coil and to generate electrical energy within the inductive coil.

U.S. Pat. No. 5,512,795, issued on Apr. 30, 1996 to Epstein et al., discloses an electrical energy generator that has a cylindrical stator, a cylindrical liner of a piezoelectric material in concentric contact with the stator, and an armature rotatable about the liner. In one embodiment, as the armature rotates, the armature squeezes successive portions of the liner against the stator for alternately compressing and decompressing the liner portions for causing them to generate electrical energy. In another embodiment, the armature causes alternating stretching and destretching of successive portions of the liner between spaced-apart portions of the stator for causing the liner portions to generate electricity.

U.S. Pat. No. 4,748,338, issued on May 31, 1988 to Boyce, discloses an apparatus for extracting energy from the waves on a body of water that includes an assembly having a buoyancy sufficient for maintaining the assembly afloat in the water. The apparatus has a series of structures mounted on the assembly that have generally upwardly-oriented beams that have upper ends connected at least indirectly to one another. A pendulum drive shaft is suspended by a cable from the upper end of the beams. Each structure has a pulley at the upper ends of the beams through which a continuous loop of the cable passes so as to suspend the pendulum drive shaft and permit the pendulum drive shaft to rotate. A ratcheted pulley mounted at the lower end of each of the beams has a second continuous loop of cable passing therethrough. The second continuous loop of cable also loops around the pendulum drive shaft causing the pendulum drive shaft to rotate as it swings by rolling within the loop of the second cable which is anchored by the ratcheted pulley. The second cable is prevented from turning by the rachet during the forward swing of the pendulum.

U.S. Pat. No. 4,492,875, issued on Jan. 8, 1985 to Rowe, discloses a buoy generator that has a hollow buoy having inner and outer surfaces, a winding mounted to the buoy parallel to the inner and outer surfaces, a magnetized member freely disposed in all dimensions within the hollow buoy for unrestricted rolling on the inside surface of the hollow buoy whenever the hollow buoy has any rolling movement, and a mechanism connected to an end of the windings for rectifying current flow therefrom. Upon mooring the buoy in the water, the flux lines of the magnetized roller cut the winding when there is water motion. Electrical current is provided by the winding to the rectifying mechanism.

U.S. Pat. No. 4,423,334, issued on Dec. 27, 1983 to Jacobi et al., discloses a wave motion powered electrical generator configured for installation in a buoy. The generator has an inverted pendulum with two windings formed at the free end thereof. The windings are aligned to articulate between two end stops. Each stop is provided with a magnetic circuit. As the loops thus pass through the magnetic circuit, electrical current is induced which may be rectified through a full-way rectifier to charge a battery. The buoy itself may be ballasted to have its fundamental resonance at more than double the wave frequency with the result that during each passing of a wave at least two induction cycles occur.

U.S. Pat. No. 4,352,023, issued on Sep. 28, 1982 to Sachs et al., discloses a mechanism for generating power from wave motion on a body of water. The mechanism includes a buoyant body which is adapted to float on a body of water and to roll and pitch in response to the wave motion of the water. A gyro-wave energy transducer is mounted on the buoyant body for translating the pendulum-like motions of the buoyant body into rotational motion. The gyro-wave energy transducer includes a gimbal that has first and second frames. The first frame is pivotally mounted to the second frame. The second frame is pivotally mounted to the buoyant body. A gyroscope is mounted to the first frame for rotation about an axis perpendicular to the axes of rotation of the first and second frames. A generator is coupled to the gyroscope for maintaining a controlled rotational velocity for the gyroscope. Transferring members are associated with one of the first and second frames for transferring torque of one of the first and second frames to the gyroscope.

U.S. Pat. No. 4,317,047, issued on Feb. 23, 1982 to de Almada, discloses an apparatus for harnessing the energy derived from the undulatory motion of a body of water that includes an assembly having a buoyancy sufficient for maintaining it afloat in the water, a first structure substantially following multidirectional undulatory motions of the water, and a second structure mounted in the assembly for free movement in a plurality of planes with respect to the first structure. The second structure is displaceable by gravity and by forces derived from the motions of the first structure. A device is connected to the first and second structures for generating a pressure output in response to the force derived from the relative motions between the first and second structures. An arrangement is coupled to the pressure output of the device for utilizing, at least indirectly, the energy derived from the pressure output.

U.S. Pat. No. 4,266,143, issued on May 5, 1981 to Ng, discloses an energy conversion device which utilizes the natural movements of ocean waves to produce electrical energy. The apparatus is contained in a tank which is adapted to float near the surface of the water and tilt from side-to-side about a pivot point located below the tank, thereby simulating a pendulum-like movement. A sinker weight is employed to produce the appropriate movement of the tank and maintain the floating tank in balance at the ocean surface. The pendulum motion of the tank is used to roll gravity wheels in the tank in such manner that shafts associated with the gravity wheels are caused to rotate. Electrical generators are operatively connected to the rotating shafts for producing electrical energy from the mechanical rotational energy of the shafts as the tank tilts from side to side with the wave motion.

U.S. Pat. No. 4,260,901, issued on Apr. 7, 1981 to Woodbridge, discloses a system for converting the mechanical energy in the wave motion of a body of water into electrical energy. A frame is fixed with respect to the wave motion of the water. A flotation element is buoyantly supported by the water and constrained to follow only the vertical component of the wave motion. The motion of the flotation element is transferred to an electrical generating device which includes a device for producing electromagnetic flux and electrical coils. The motion of the flotation element causes relative motion between the flux-producing device and the electrical coils thereby generating an electromotive force. A positioning subsystem is provided for moving the electrical generating device relative to the flotation element when the average depth of the body of water changes so as to maintain a symmetrical relative motion between the flux-producing device and the electrical coils.

U.S. Pat. No. 4,251,991, issued on Feb. 24, 1981 to Wood, discloses an apparatus for generating power from the motion of a wave on a body of water that utilizes a spine formed by buoyant sections that are joined end-to-end and are ballasted so as to cause the sections to assume a predetermined position in calm water. Adjacent sections are joined in a manner enabling the sections to pivot more easily about at least one non-vertical axis when the sections are in the predetermined position. When the apparatus is subjected to wave motion the surge component of the wave motion is converted to vertical motion of the spine. Prime movers are mounted on the spine so as to rock relative to the spine under the heave component of wave motion, and under the vertical motion of the spine. The rocking motion of the prime movers is utilized to produce energy.

U.S. Pat. No. 4,110,630, issued on Aug. 29, 1978 to Hendel, discloses a wave-powered electric generator. The generator includes a buoyant envelope tethered to a fixed point relative to the sea bottom. The buoyant envelope is water and air-tight. One or more stators and one or more elements moveable by the force of inertia are positioned within the stator. The buoyant envelope is a rectifier for rectifying the electric energy generated by the moveable element. A power transmission mechanism supplies the generated and rectified electric energy to a power station. In a preferred embodiment, a conductive fluid is employed as a moveable element. The fluid is passed through a concentrated magnetic field.

U.S. Pat. No. 3,696,251 issued on Oct. 3, 1972 to Last et al., discloses an electric generator for deriving electrical energy from oscillatory motion such as that of buoys, vehicles and animals. The generator has a stator and an armature coupled together by a spring mechanism. The coupling generates current when bodily movement of the generator causes, by inertia effects, relative movement of the armature and stator.

U.S. Patent Publication No. 2010/0228401, published on Sep. 9, 2010 to Hench, describes a method and apparatus for harnessing power associated with ocean waves and converting that power into electricity. The apparatus is a buoy that houses a vertically-oriented central shaft, a pendulum and a generator. As the buoy tilts from the vertical under the influence of wave motion, the pendulum is accelerated and rotates about the central shaft. A fin array is located along the bottom of the buoy to serve as an anti-torque mechanism and improves the operational efficiency of the electricity production.

U.S. Pat. No. 7,737,569, issued on Jun. 15, 2010 also to S. C. Hench, shows a system and method for converting ocean wave energy into electricity. A buoy is provided that houses a vertically-oriented central shaft, a pendulum, a generator mechanism and other components that synergistically operate to optimize power output of the buoy. The buoy can be part of a network that shares environmental data and a series of best tuning responses to that data, across the network. A library of environmental data and associated tuning responses is built at a central location and shared across the network U.S. Patent Application No. 2010/0228401, published on Sep. 9, 2010 also S. C. Hench, teaches a buoy that houses a vertically-oriented central shaft, a pendulum, a generator mechanism and other components. Both the load on the pendulum and the effective length of the pendulum can be varied in response to changing environmental conditions. The buoy is part of a network that shares environmental data and a series of best tuning responses to that data. A library of environmental data and associated tuning responses is built at a central location and shared across the network.

It is an object of the present invention to provide a wave energy converter that improves power generation.

It is another object of the present invention to provide a wave energy converter that protects critical system components from direct contact with the ocean and its surrounding environment.

It is another object of the present invention to provide a wave energy converter that reduces long term maintenance costs.

It is still another object of the present invention to provide a wave energy converter that reduces inactivity due to adverse environmental conditions.

It is another object of the present invention to provide a wave energy converter that utilizes the flow of hydraulic fluid to produce electrical energy.

It is still another object of the present invention to provide a wave energy converter that can be placed in any body of water having waves.

It is still another object of the present invention to provide a wave energy converter that maximizes energy conversion for various wave frequencies.

It is another object of the present invention to provide a wave energy converter that maximizes energy conversion for various wave sizes.

It is another object of the present invention to provide a wave energy converter that utilizes variable damping of a pendulum to produce electrical energy.

These and other objects and advantages of the present invention will become apparent from a reading of the attached specification and appended claims.

BRIEF SUMMARY OF THE INVENTION

The present invention is a wave energy converter that comprises a shell, a pendulum pivotally positioned in the shell, a pump linked to the pendulum, a motor interconnected to the pump, a motor interconnected to the pump, an electrical generator connected to the motor, and a pendulum adjuster operatively connected to the pendulum. The pump is operable by a movement of the pendulum so as to pump a hydraulic fluid outwardly therefrom. The motor is interconnected to the pump such that the hydraulic fluid from the pump causes a rotation of the motor. The electrical generator is connected to the motor such that the rotation of the motor causes the electrical generator to produce electrical energy. The pendulum adjuster changes the center of gravity of the pendulum.

In the preferred embodiment of the present invention, a hydraulic rectifier is operatively connected to the pump so as to cause a unidirectional flow of the hydraulic fluid. A pressure sensor is operatively connected to the pump so as to measure a pressure of the hydraulic fluid in the pump or a pressure of the hydraulic fluid passing outwardly of the pump. Additionally, a position sensor is connected to the pendulum so as to measure the position of the pendulum. A rotation sensor is connected between the pendulum and shell. A controller is cooperative with the rotation sensor and to the pendulum adjuster. The controller activates the pendulum adjuster upon receiving a signal from the rotation sensor.

The hydraulic rectifier comprises at least one valve. The controller is operatively connected to the pressure sensor and to the valve so as to selectively open or close the valve in relation to a pressure as sensed by the pressure sensor.

In an embodiment of the present invention, the pump includes a piston-and-cylinder assembly. The piston-and-cylinder assembly is linked to the pendulum such that the pendulum moves the piston in relation to the cylinder of the piston-and-cylinder assembly so as to discharge the hydraulic fluid to an outlet of the cylinder. Alternatively, the pendulum has a mounting assembly connected thereto. The piston of the piston-and-cylinder assembly is movable in relation to the cylinder of the piston-and-cylinder assembly relative to the motion of the pendulum. The pump can be a double-acting piston-and-cylinder assembly. The piston defines a first chamber and a second chamber in the cylinder of the piston-and-cylinder assembly. A fluid reservoir is connected to the inlet of the first and second chambers so as to charge the first and second chambers with hydraulic fluid. A pressurized fluid storage is connected to an outlet of the first and second chambers so as to receive the discharged hydraulic fluid from the first and second chambers. The pressurized fluid storage is connected to the motor so as to supply pressurized hydraulic fluid to the motor.

In another embodiment of the present invention, the pendulum has a shaft extending therefrom. The shaft is rotatable in relation to a motion of the pendulum. The pump, in this embodiment, is a displacement pump that is cooperative with the shaft such that a rotation of the shaft causes a rotation of the displacement pump so as to cause the hydraulic fluid to be pumped therefrom. The shaft can have a gear affixed thereto. The displacement pump also has a gear engaged with the gear of the shaft such that a rotation of the gear of the shaft causes a corresponding rotation of the gear of the displacement pump.

The motor is coupled by at least one shaft to the electrical generator. A flywheel is affixed to the shaft between the motor and the electrical generator. A pressurized fluid supply is connected to the motor so as to supply hydraulic fluid, under pressure, to the motor separate from or in conjunction with the pump.

The present invention is also a wave energy converter that comprises a shell, a pendulum pivotally positioned in the shell, a variable damping means for varying a resistance to a motion of the pendulum, and an electrical generating means operatively connected to the variable damping means so as to produce electrical energy in relation to the hydraulic fluid as passed by the variable damping means. A hydraulic motor is operatively connected to the variable damping means so as to receive the hydraulic fluid as passed by the variable damping means. The hydraulic motor is drivingly connected to the electrical generating means. A pendulum adjusting means is provided for varying a center of gravity of the pendulum. A pump is linked to the pendulum so as to pass hydraulic fluid in relation to the motion of the pendulum. A hydraulic rectifying means serves to pass the hydraulic fluid from the variable damping means in a single direction toward the hydraulic motor.

In this section, the preferred embodiments of the present invention has been described. The language used under this section is, in no way, intended to be limiting of the scope of the present invention. The scope of the present invention should be construed in relation to the claims attached hereto.

DETAILED DESCRIPTION OF THE INVENTION

Figure 1:
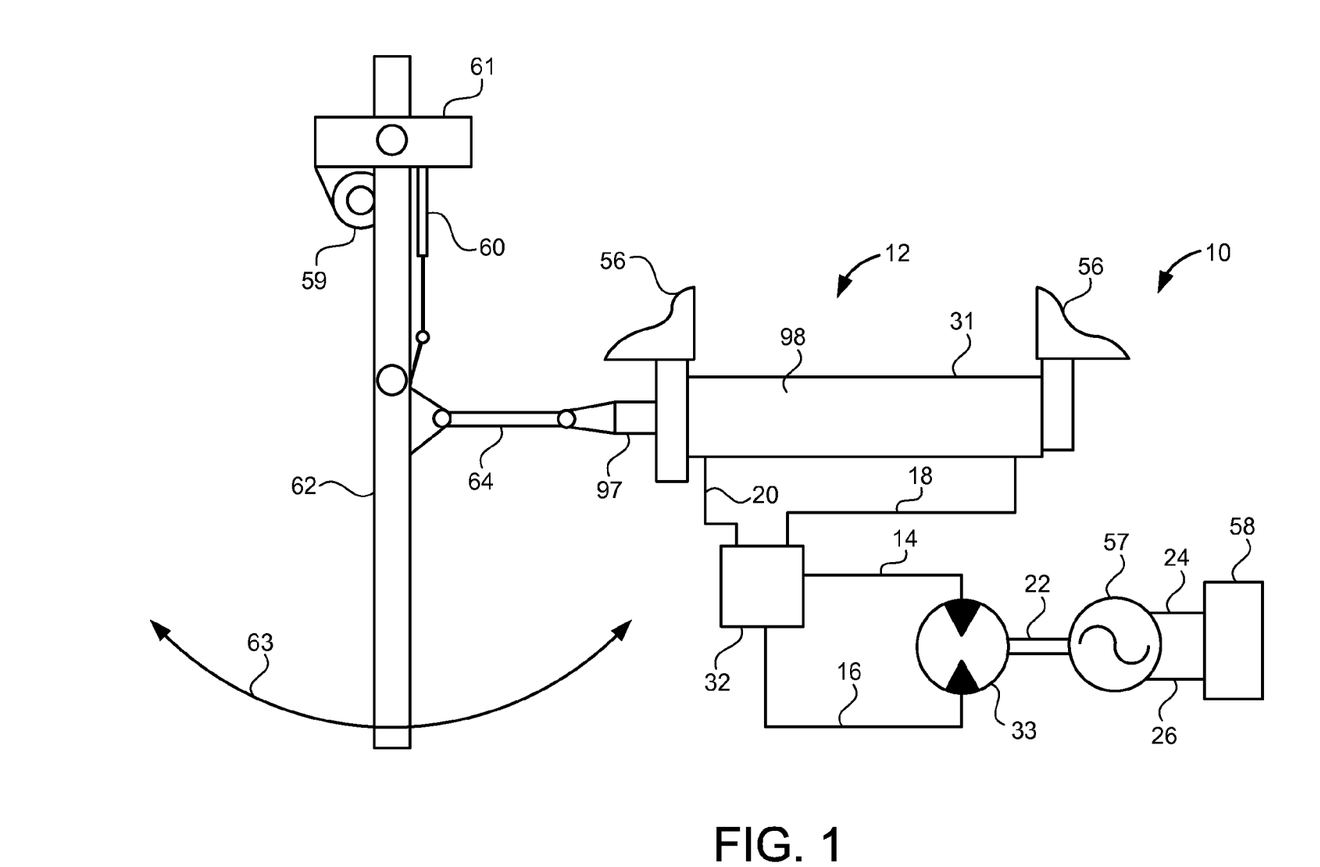
FIG. 1 is a diagrammatic illustration of the wave energy converter in accordance with a simplified form of the present invention.

Referring to FIG. 1, there is shown at 10 the hydraulic wave energy converter in accordance with the teachings of the present invention. The wave energy converter 10 includes a shell 56. The pendulum 62 is pivotally mounted within the shell 56. A variable damping system 12 is linked to the pendulum 62 so as to exert a variable damping force relative to the movement of the pendulum 62. A hydraulic motor 33 is connected by lines 14 and 16 to a hydraulic rectifier 32. The hydraulic rectifier 32 is connected by line 18 and 20 to a pump 31. The pump 31 is a double-acting pump. The hydraulic motor 33 is connected by electrical shaft 22 to an electrical energy converter 57. The electrical energy converter 57 produces energy as a result of the rotation of shaft 22 as caused by the hydraulic motor 33. The electrical energy converter 57 passes electrical energy along lines 24 and 26 to the load 58.

Specifically, with reference to FIG. 1, the rotor of the electrical energy converter 57 is moved by the hydraulic motor 33 that is driven by the motion of the pendulum 62. As a wave imparts mechanical energy onto the shell 56 of the wave energy converter 10, the pendulum 62 oscillates along path 63. A link 64 is pivotally connected to the pendulum 62. The pump 31 is pivotally connected to the link 64. The pump 31 is a hydraulic pump that includes a piston, 97 and a cylinder 98. The piston 97 is pivotally connected to the link 64. The piston 97 moves in and out of the cylinder 98 as the pendulum 62 oscillates along path 63. Hydraulic fluid is pumped from the cylinder 98 along lines 18 and 20 to the hydraulic rectifier 32. The hydraulic motor 33 is driven by hydraulic fluid from the hydraulic rectifier 32. The hydraulic motor 33 turns the rotor relative to the stator in the electrical energy converter 57. Electrical energy, i.e. electricity, is sent to the load 58.

The pendulum 62 has a mounting assembly 61. A position sensor 60 is mounted to the mounting assembly 61 and senses the position of the pendulum 62. The pendulum adjuster 59 can adjust the center of gravity of the pendulum 62.

In the present invention, a mechanical energy, such as a wave, is imparted upon the shell 56. Because the pendulum 62 is connected to the shell 56, any energy imparted onto the shell 56 is transferred to the pendulum 56. Although mechanical energy can be exerted upon the shell 56 in any three-dimensional direction, for the purpose of mathematical simplicity, only the applied horizontal motion of the wave against the shell 56 demonstrates the efficiency of the wave energy converter 10 of the present invention. The following equation is the basic differential equation of motion for a pendulum 62 that is acted upon by an external force at its pivot along with a damping force:

$$I\theta''+c\theta'+mgd\theta=-mx''  \quad \text{eqn. (1)}$$

The symbol "I" is the moment of inertia the pendulum 62. The symbol "c" is the damping coefficient. The symbol "m" is the mass of the pendulum 62. The symbol "g" is the gravitational constant. The symbol "d" is the distance between the center of gravity of the pendulum 62 and the pivot axis of the pendulum 62. The symbol "x''" is the acceleration of the pendulum 62 as a function of the mechanical energy, i.e. wave, acting upon the wave energy converter 10. For simplicity purposes, x'' and θ are considered sinusoidal-varying functions expressed in terms of a single circular frequency, $\omega$, and time, t. Applying the sinusoidal functions and rewriting the equation produces the following equation:

$$I\Theta\omega^2*\sin(\omega t-\phi+\pi)+c\Theta\omega*\sin(\omega t-\phi+\pi/2)+mgd\Theta*\sin(\omega t-\phi)=mx\omega^2*\sin(\omega t) \quad \text{eqn. (2)}$$

As known from the study of mechanical system dynamics, a system acting under the influence of a time-varying force will experience resonance when the frequency of the time-varying force is equal to the natural frequency of the system itself. The resonance condition represents the condition of maximum energy transfer between the time-varying force and the mechanical system. The natural frequency of a pendulum is strictly based on the distance between the center of gravity of the pendulum and the pivot axis of the pendulum, independent of the mass of the pendulum.

Thus, the pendulum 62 of the present invention has a pendulum adjusting means that adjusts the distance between the center of gravity of the pendulum 62 and the pivot axis of the pendulum 62. The pendulum adjusting means moves the pendulum up and down relative to the mounting assembly 61 so as to change the distance of the center of gravity and the pivot axis. A greater distance between center of gravity and the pivot axis of the pendulum 62 causes the pendulum 62 to oscillate more slowly. A small distance between the center of gravity and the pivot axis of the pendulum 62 causes the pendulum 62 to oscillate more quickly. Thus, if wave has a high frequency of recurrence, the pendulum adjusting means adjusts the distance between the center of gravity and the pivot axis so that the pendulum will swing quicker so as to achieve a harmonic resonance with the frequency of the wave and thus optimize the amount of electricity generated. If the frequency of the wave is low, then the pendulum adjusting means increases the distance between the center of gravity 16 and the pivot axis so that the pendulum 62 swings, or oscillates, more slowly so as to match the harmonic resonance of the waves and optimize the generation of electricity by the electrical generator 57.

The circular natural frequency of the pendulum is expressed as a function of the distance between the center of gravity of the pendulum 62 and the pivot axis of the pendulum 62 by the following equation:

$$\omega=(g*d/0.083*L^2*d^2)^{0.5} \quad \text{eqn. (3)}$$

The symbol "d" is the distance between the center of gravity of the pendulum 62 and the pivot axis of the pendulum 62. The symbol "L" is the length of the pendulum 62, which is constant because the length of the pendulum 62 is always the same. "$\omega$" and "g" were defined above. The above equation is used by a controller positioned in the shell 56.

A rotation sensor is connected between the pendulum 62 and the shell 56 as to determine the oscillation rate of the pendulum 62. This oscillation rate is then used in the above or similar equation as the circular natural frequency of the pendulum 62, and the controller then calculates the distanced that is needed between the center of gravity of the pendulum 62 and the pivot axis of the pendulum 62 so as to have the pendulum 62 match the frequency of the wave. Manipulation of the symbol "d" effects both the inertial and gravitational terms of the second equation above. Once the controller knows the distance needed for the pendulum 62, the pendulum adjusting means is activated by the controller so as to change the distance between the center of gravity and the pivot axis. The position sensor 60 communicates the position of pendulum 62 to the controller.

The damping term, $c\Theta\omega$, of second equation is a mathematical expression for the rate of energy removal from the WEC 10. Varying this term controls the rate at which energy is converted from mechanical energy to electrical energy. The rate as which energy is converted from mechanical energy to electrical energy in the WEC 10 of the present invention can be varied by controlling the amplitude of the motion of the pendulum 62 along path 63. Controlling the amplitude of the motion of the pendulum 62 allows the wave energy converter 10 to be designed to operate over a defined range of motion which is useful in determining the overall dimensions of the pendulum 62.

Figure 2:
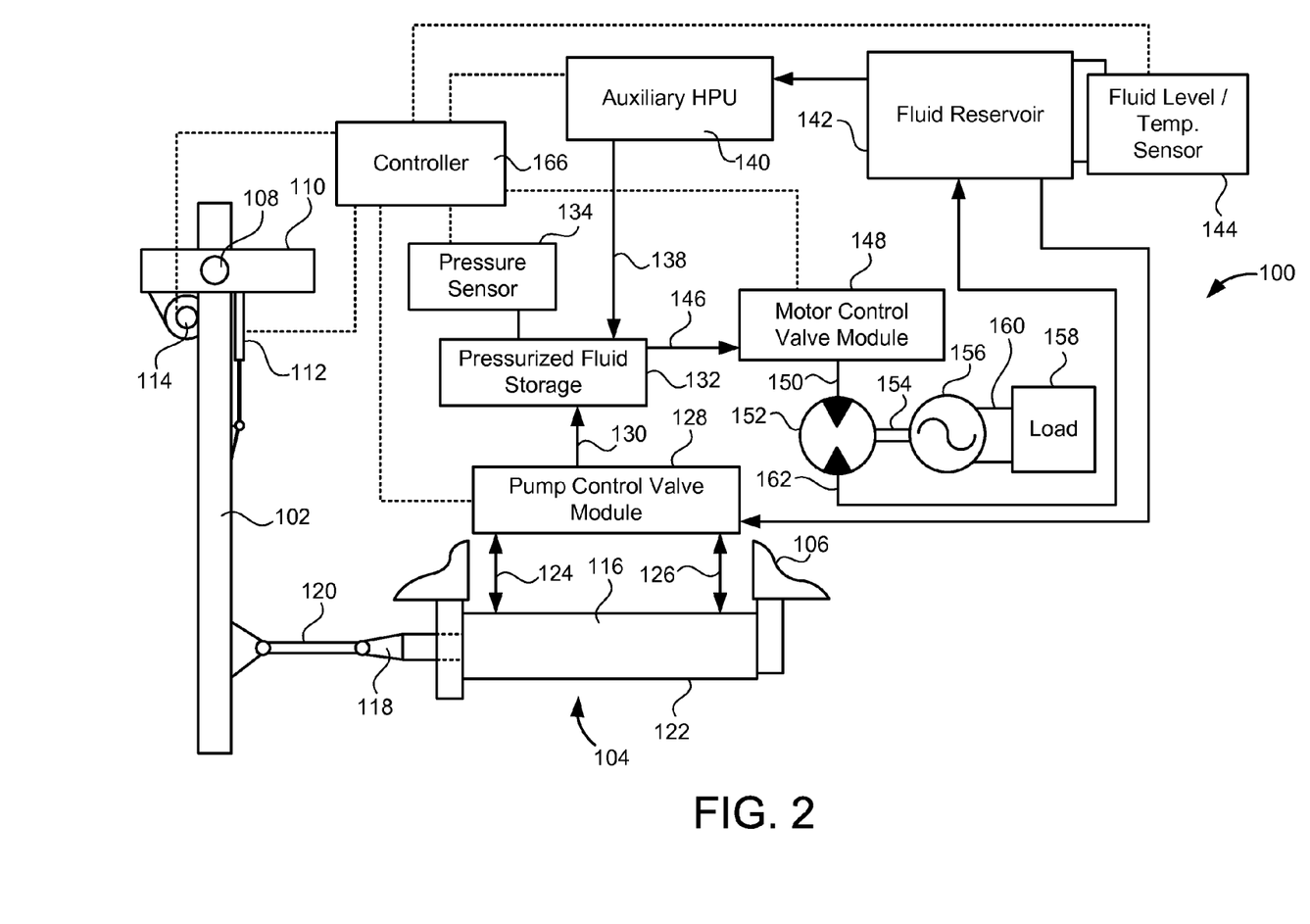
FIG. 2 is a diagrammatic illustration of the wave energy converter of the present invention in accordance with a preferred embodiment of the present invention.

FIG. 2 is a diagrammatic illustration of the preferred embodiment of wave energy converter 100 of the present invention. Specifically, there is a pendulum 102 that is pivotally mounted within a shell. The variable damping means 104 is linked to the pendulum 102 whose amplitude can be damped by the variable damping means 104. The variable damping means 104 is supported within upon the shell 106.

The pendulum 102 has a pivot axis 108 supported by a mounting assembly 110. As with the previous embodiment, there is a position sensor 112 that is utilized so as to determine the position of the center of gravity of the pendulum 102. A pendulum adjuster 114 is provided so as to controllably adjust the center of gravity of the pendulum 102.

The variable damping means 104 includes a pump 116 that has piston 118 connected by link 120 to the pendulum 102. The pump 116 is a double-acting pump having a first chamber and a second chamber defined by piston within the interior of the cylinder 122 of the pump 116. As such, as the piston 118 moves back-and-forth as a result of the movement of the pendulum 102, hydraulic fluid can be passed outwardly of outlets associated with each of these chambers. Arrows 124 and 126 illustrate the flow of hydraulic fluid outwardly of the pump 116. As the movement of the piston discharges hydraulic fluid through an outlet of one of the chambers, hydraulic fluid is then introduced into the other chamber so that the back-and-forth motion of the piston 118 will cause a constant flow of hydraulic fluid. A pump control valve module 128 is connected to the outlet of the pump 116 so as to properly manipulate the charging and discharging of hydraulic fluid from the pump 116. The pressurized hydraulic fluid can then pass along lines 130 to a pressurized fluid storage 132. A pressure sensor 134 will measure the pressure of the hydraulic fluid in the pressurized fluid storage 132. An auxiliary hydraulic power unit 140 is connected by line 138 to the pressurized fluid storage 132 so as to supplement the hydraulic pressure of the fluid within the pressurized fluid storage 132. The fluid reservoir 142 serves to provide hydraulic fluid to the auxiliary hydraulic power unit 140. A fluid level/temperature sensor 144 is operatively connected to the fluid reservoir 142 so as to measure the level of the fluid therein and the temperature of the fluid therein.

The pressurized hydraulic fluid in the pressurized fluid storage can then pass along line 146 to the motor control valve module 148. This motor control valve module 148 delivers hydraulic fluid under pressure along line 150 to the hydraulic motor 152. As such, the introduction of such high pressure hydraulic fluid will cause the hydraulic motor 152 to rotate shaft 154 for the operation of the electrical generator 156. The load 158 is connected by lines 160 to the electrical generator 156. The discharged hydraulic fluid will pass along line 162 back to the fluid reservoir 142. The fluid reservoir 142 also supplies hydraulic fluid to the pump control valve module 128.

Importantly, there is a controller 166 that is operatively connected to the various systems within the wave energy converter 110. As such, the controller 166 can receive inputs from the pump control valve module 128, from the pressure sensor 134, from the motor control valve 148, from the auxiliary hydraulic power unit 140, and from the fluid level/temperature sensor 144. Suitable algorithms can be utilized so that the controller can properly manipulate the center-of-gravity of the pendulum 126 by manipulating the pendulum adjustor 114. Similarly, the controller can receive, as an input, the position information as indicated by the position sensor 112.

In FIG. 2, there is shown the linearly-actuated pump 116 that is powered by coupling the pump 116 to the pendulum 102. The pump 116 energizes a pressurized fluid storage 132. This pressurized fluid storage 132 can be in the form of an accumulator bank. Once the pressurized fluid storage 132 reaches a predetermined pressure, the controller 116 actuates the valve within the motor control valve module 148 so as to allow the pressurized fluid to discharge across at least one hydraulic motor 152. The hydraulic motor 152 is coupled to at least one electrical generating device 156. The hydraulic motor 152 drives the electrical generating device 156 so as to produce useful electrical power. The pump control valve module 128 controls the number of active pumps, such as pump 116, that acts to pressurize fluid. The selective control of the active number of pumps (or their fluid output) governs the amount of damping experienced by the pendulum 102 by virtue of the variable damping means 104. A combination of controlling the position of the center-of-mass of the pendulum 102 relative to the pivot 108 and the amount of damping experienced by pendulum 102 allows the control system to achieve the optimum amount of energy that can be harvested by the wave energy converter 100.

Figure 3:
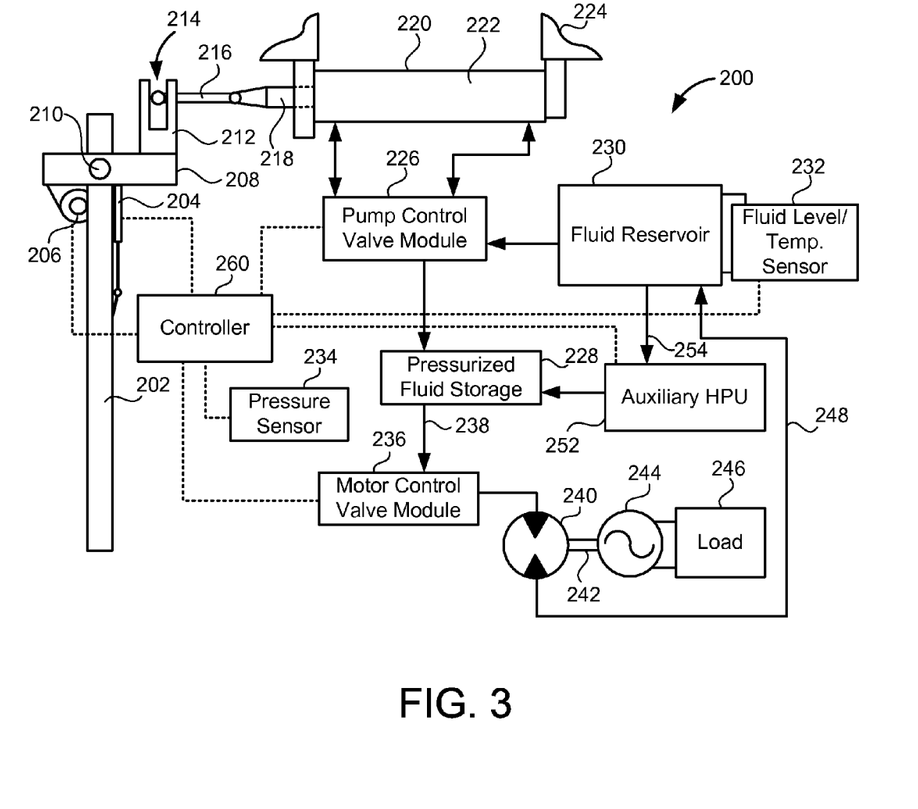
FIG. 3 is a diagrammatic illustration of the wave energy converter of the present invention in a first alternative embodiment of the invention.

FIG. 3 shows a first alternative embodiment 200 of the wave energy converter of the present invention. In FIG. 3, there is shown the pendulum 202 that has a position sensor 204 and a pendulum adjuster 206 in the nature of the previous embodiments. The mounting assembly 208 is positioned adjacent to the pivot axis 210 of the pendulum 202. The mounting assembly 208 includes a member 212. Member 212 has a channel 214 (or slot) that serves to receive an end of the link 216 connected to the piston 218. As such, as the pendulum 202 moves back-and-forth, the slotted member 212 will cause the link 216 to move back-and-forth so as to similarly move the piston 218 within the cylinder 220 of the pump 222. Both the pendulum 202 and the pump 222 are supported within the shell 224.

As with the previous embodiments, there is a pump control valve module 226 that serves to deliver and receive the charging hydraulic fluid and the discharged hydraulic fluid from the pump 222. The pump control valve module serve to transmit a unidirectional flow of hydraulic fluid to the pressurized fluid storage 228. A fluid reservoir 230 can provide hydraulic fluid to the pump control valve module 226 so as to effectively charge the chambers within the double-acting pump 222. A fluid level/temperature sensor 232 is operatively connected to the fluid reservoir in the nature of the previous embodiment.

A pressure sensor 234 is connected to the pressurized fluid storage 228 so as to measure the pressures therein.

The motor control valve module 236 receives a unidirectional flow of hydraulic fluid along line 238 from the pressurized fluid storage 228. As in the previous embodiment, the motor control valve module delivers this unidirectional flow of hydraulic fluid through the hydraulic motor 240. The hydraulic motor 240 will rotate the shaft 242 connected to the electrical generator 244 so that electrical energy can be delivered to the load 246. The discharged hydraulic fluid from the hydraulic motor 240 will flow along line 248 back to the fluid reservoir 230. An auxiliary hydraulic power unit 252 receives hydraulic fluid from the fluid reservoir 230 along line 254. In the event of very little wave action affecting the pendulum 202, the auxiliary hydraulic power unit 252 can deliver high pressure hydraulic fluid back through the pressurized fluid storage 228 and into the motor control valve module. As such, the hydraulic motor 240 and the associated electrical generator 244 can continue to operate under no wave action or light wave action.

The controller 260 receives inputs from the various components of the wave energy converter 200, in the manner described in association with the previous embodiment. As such, the controller can properly utilize algorithms so as to manipulate the center-of-mass of the pendulum 202 through the use of the pendulum adjuster 206.

In the wave energy converter 200, the linearly-actuated pump 222 is mechanically coupled to the mounting assembly rather than directly to the pendulum 202. An electrical power conditioner unit can be located between the electrical generator 244 and the load 246. This item can be located internally or externally to the shell 224. The auxiliary hydraulic power unit 252 is used to supply a second means of supplying pressurized fluid to the pressurized fluid storage 228. This capability allows fluid power to be available during periods of time where the wave energy converter 200 may be idle. The auxiliary hydraulic power unit 252 can be powered by batteries which could be charged by either solar panels or by the wave energy converter 200. The pump control valve module 226 and the motor control valve module 236 are collections of solenoid-actuated valves that can be used to selectively engage or disengage pumps and motors by the controller 260 for the purpose of optimizing the electrical generating capacity of the wave energy converter 200. The pump control valve module 226 can act as a rectifier circuit or can be a separate component.

Figure 4:
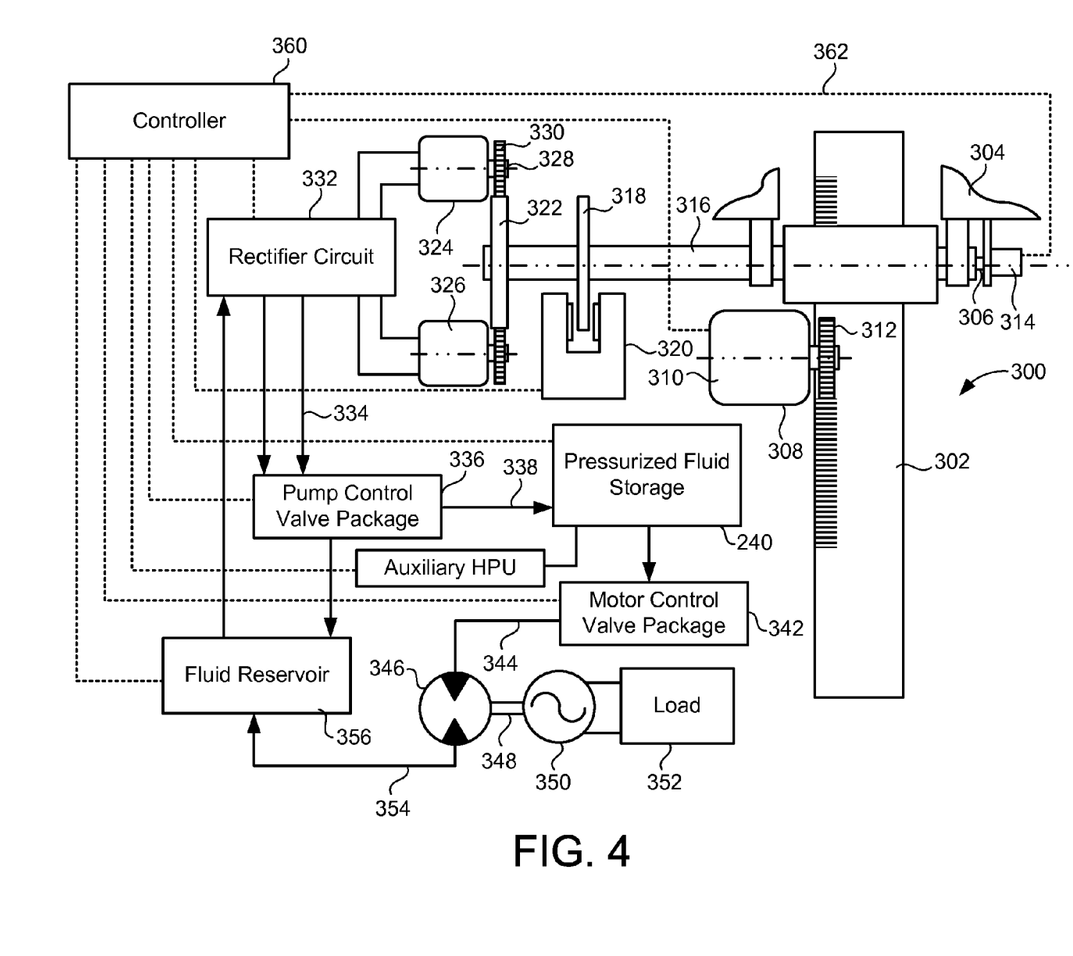
FIG. 4 is a diagrammatic illustration of the wave energy converter of the present invention in association with a second alternative embodiment.

In FIG. 4, there is shown second alternative embodiment of the wave energy converter 300 of the present invention. In FIG. 4, the wave energy converter 300 has a pendulum 302 that is pivotally mounted within the shell 304. In particular, the pendulum 302 has a pivot axis 306. A pendulum adjuster 308 serves to suitably adjust the center-of-mass of the pendulum 302 with respect to pivot axis 306. In this embodiment of the present invention, the pendulum adjuster 308 is in the nature of an electric motor 310 that has a toothed gear 312 which engages linear gear teeth 314 formed on the pendulum 302. As such, the rotation of the gear 312 can be used so as to raise or lower the pendulum 302 with respect to pivot axis 306. A rotation sensor 314 is suitably connected to the pivot axis 306 so as to measure a rate of oscillation of the pendulum 302.

The pendulum 302 has a shaft 316 extending therefrom. The oscillation of the pendulum 302 will cause a corresponding rotation of the shaft 316. A disc 318 is mounted on the shaft 316. A suitable caliper brake 320 is provided in association with the disc 318 so as to provide for braking capabilities and/or for locking the position of the pendulum 302. A gear 322 is also affixed to the shaft 316. Gear 322 will serve to operate the displacement pumps 324 and 326. Displacement pump 326 serves to transmit pressurized hydraulic fluid by virtue of a rotation of a shaft 328. Shaft 328 has a gear 330 affixed thereto. The teeth of gear 330 will mesh with the teeth associated with gear 322 such that the rotation of the shaft 316 will cause a corresponding rotation of the gear 330 and the shaft 328 of the displacement pump 324. The displacement pump 326 will operate in a similar manner. As such, the rotational movement of the shaft 316 can cause simultaneously the operation of at least a pair of displacement pumps 324 and 326.

The displacement pumps 324 and 326 are connected to a rectifier circuit 332. Rectifier circuit 332 will causes a unidirectional flow of pressurized hydraulic fluid therefrom along line 334 to the pump control valve package 336. The pump control valve package can then be operated so as to transmit the pressurized hydraulic fluid along line 338 to the pressurized fluid storage 340. The pressurized fluid within the pressurized fluid storage 340 is delivered to the motor control valve package 342. This motor control valve package 342 can then deliver the pressurized hydraulic fluid along line 344 to the hydraulic motor 346. Hydraulic motor 346 can then rotate the shaft 348 so as to generate electrical power in the electrical energy generator 350. Electrical energy generator 350 can then transmit electrical energy to the load 352 in the manner described herein previously. The discharged hydraulic fluid passing through the hydraulic motor 346 is delivered along line 354 to a fluid reservoir 356. The fluid reservoir can deliver the hydraulic fluid to the rectifier circuit so as to provide the charging fluid for the displacement pumps 324 and 326.

It should be noted that the pressurized fluid storage 340 can utilize the high pressure hydraulic fluid for the operation of the brake 320 and for the operation of the motor 310 of the pendulum adjuster 308. The controller 360 is connected to the various components for the control of the position of the pendulum 302. The controller 360 also has a line 362 connected the rotation sensor 314 so as to properly manipulate the algorithms for the control of the wave energy converter 300. It should be noted that the controller 360 does not, in any way, sense environmental conditions affecting the wave energy converter 300. All of the control inputs are from the WEC system itself.

In FIG. 4, the displacement pumps 324 and 326 are coupled to the pendulum 302 such that the oscillatory motion causes the pump to operate. Several pumps can be located around the gear 322 which is rigidly connected to the mounting assembly. The hydraulic fluid is pumped through the rectifier circuit 332 and into the pump control valve module 336. The controller 360 selectively engages and disengages valves within the pump control valve module 336 so as to route the hydraulic fluid either to the pressurized fluid storage 340 or to the fluid reservoir 356. This action is the variable damping capability of the wave energy converter 300. In the wave energy converter 300, the pumps are fixed displacement type pumps, i.e. the amount of fluid displaced per rotation on the pump's shaft, is a predetermined amount. The rectifier circuit 332 can be located externally to the pumps or the rectifier circuit 332 can be individually located on each pump.

Figure 5:
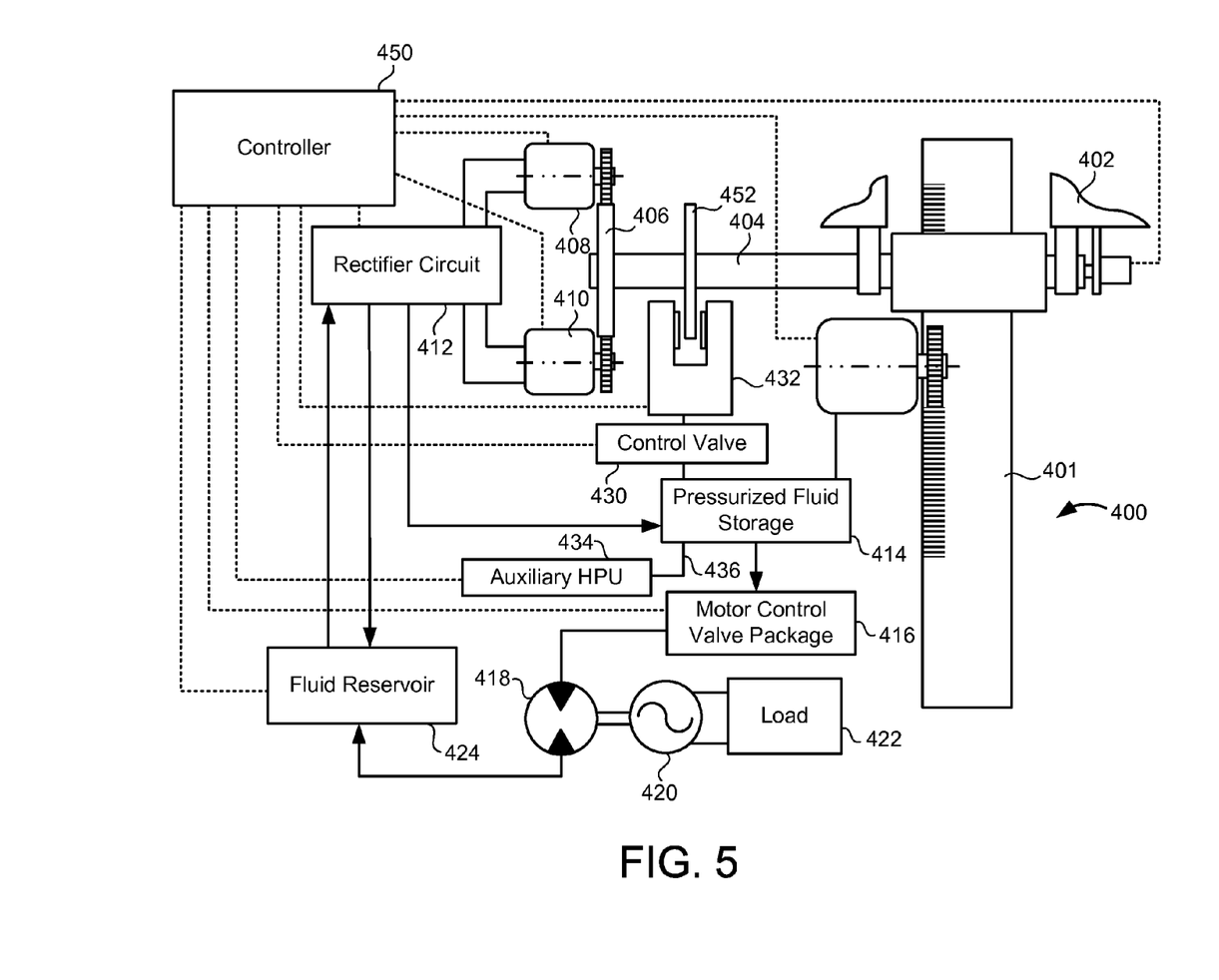
FIG. 5 is a diagrammatic illustration of the wave energy converter of the present invention in a third alternative embodiment.

FIG. 5 shows another alternative embodiment of the wave energy converter 400. Wave energy converter 401 is a minor variation on the wave energy converter 300, as shown in FIG. 4. In FIG. 5. The pendulum 401 is mounted within the shell 402 in the manner shown in FIG. 4. The shaft 404 extends so as to have the gear 406 at one end. Gear 406 engages with the displacement pumps 408 and 410. The pumps 408 and 410 connect to the rectifier circuit 412. The discharged hydraulic fluid from the rectifier circuit 412 passes to the pressurized fluid storage 414. The pressurized fluid storage delivers the pressurized hydraulic fluid to the motor control valve module 416 which, in turn, flows through the hydraulic motor 418 so as to produce electrical energy from the electrical energy generator 420 in the manner described herein previously. The load 422 is electrical connected to the electrical generator 420. The discharged fluid from the hydraulic motor 418 flows to the fluid reservoir 424.

In FIG. 5, it can be seen that there is control valve 430 that is operatively connected to the pressurized fluid storage 414 and to the brake 432. An auxiliary hydraulic power unit 432 is connected by line 436 to the pressurized fluid storage 414. As such, as in the embodiment shown in FIG. 3, the auxiliary hydraulic power unit 432 can operate the hydraulic motor 418 and the generator 420 during idle or light wave conditions. The controller 450 is also connected by various lines of the various components.

In FIG. 5, the wave energy converter 400 utilizes variable displacement pumps 408 and 410. The pumps 408 and 410 internally contain the ability to vary their displacement, i.e. the amount of fluid displaced per rotation on the pump's shaft. This variable displacement can be controlled by way of the controller 450. This action to selectively vary the amount of displaced fluid output from the pumps 408 and 410 causes a variation of the damping acting on the pendulum 401. As such, this is the variable damping means. The disc 452 can be controlled by the controller 450 so as to provide either damping assistance or a parking capability acting upon the pendulum 401.

Figure 6:
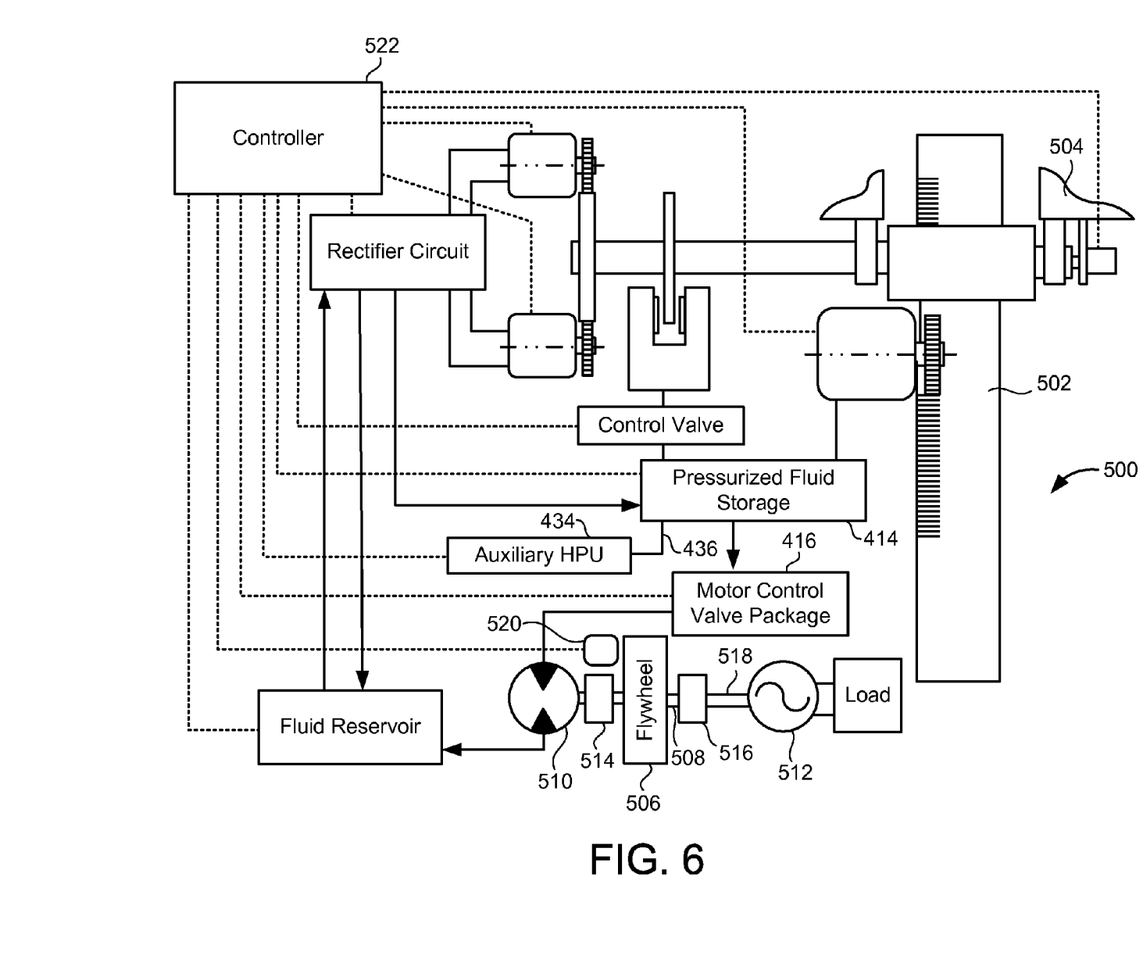
FIG. 6 is a diagrammatic illustration of the wave energy converter of the present invention in a fourth alternative embodiment.

FIG. 6 shows another alternative embodiment of the wave energy converter 500 in accordance with the present invention. Wave energy converter 500 is a variation on the embodiment shown in FIGS. 4 and 5. The wave energy converter 500 includes a pendulum 502 that is mounted in shell 504. Importantly, in FIG. 6, there is a flywheel 506 that is mounted upon a shaft 508 that is coupled between the hydraulic motor 510 and the electrical energy generator 512. In particular, a coupling 514 and a coupling 516 are used so as to join the flywheel 506 to the shaft 518 extending to the electrical generator 520. A sensor 520 is provided in proximity to the flywheel 506 so as to sense the rotation of the flywheel. Controller 522 monitors the rotation of the flywheel 506 by way of the flywheel sensor 520.

The flywheel 506 is driven by the hydraulic motor 510 which is directly connected or interconnected to the flywheel 506. The generator 512 is driven by the flywheel 506 which is directly connected or interconnected to the generator 512. The speed of the flywheel 506 is monitored by using the rotation sensor 520. This provides information to the controller 522 allowing the speed of the flywheel to be modulated as need to produce electrical energy via the generator 512. The generator 512 can be a fixed inductance device or a variable inductance device. In the case of the variable inductance device, the power producing capacity of the generator 512 can be actively matched to that of the flywheel 506. This produces an optimal power producing arrangement. The value of the inductance desired would be decided by the controller 522. The variable inductance can also be accomplished by using more than one generator coupled to the flywheel 506 and the controller acting to engage or disengage the generators as need to obtain optimal power production.

Figure 7:
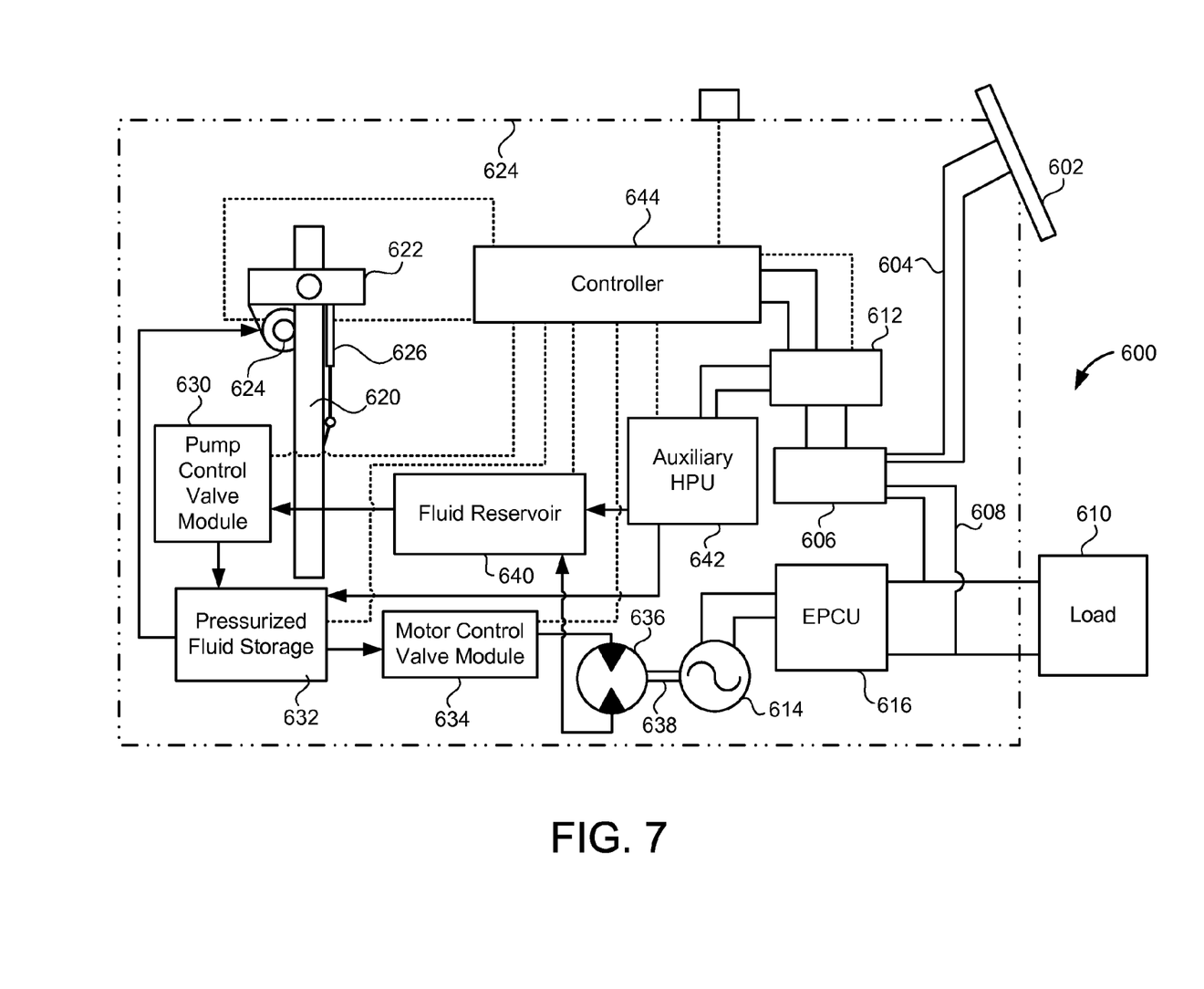
FIG. 7 is a diagrammatic illustration of the wave energy converter of the present invention in association with a fifth alternative embodiment.

FIG. 7 shows another alternative embodiment of the wave energy converter 600 of the present invention. In particular, in FIG. 7, a solar panel 602 is connected by line 604 to a battery charger 606. The battery charger 606 is, in turn, connected by line 608 to the load 610. The battery charger 606 can also be connected to the battery bank 612 so as to provide charging capability for the battery bank 612. In the event of a lack of solar energy, electricity from the load can be used to charge the battery bank 612.

The electrical generator 614 has an electrical power conditioning unit 616 positioned therealong. This electrical power conditioning unit 616 is positioned between the electrical generator 614 and the load 610.

As with the previous embodiments, the pendulum 620 is pivotally mounted to a mounting assembly 622 within a shell 624. A pendulum adjuster 626 can be utilized so as to adjust the center-of-mass of the pendulum 620. A position sensor 626 is also provided so as to determine the position of the pendulum 620. The pendulum 620 can be utilized so as to deliver pressurized hydraulic fluid in various manners, such as those shown in the previous embodiments. Ultimately, the hydraulic fluid passes through the pump control valve module 630 and into the pressurized fluid storage 632. The pressurized fluid storage 632 delivers hydraulic fluid to the motor control valve module 634. Ultimately, the pressurized hydraulic fluid will pass to the hydraulic motor 636 so as to drive the shaft 638 of the electrical generator 614. The discharged fluid from the hydraulic motor 636 is delivered to the fluid reservoir 640. The auxiliary hydraulic power unit 642 can be utilized, in association with the fluid reservoir 640 and the pressurized fluid storage 632, so as to provide pressurized hydraulic fluid in the event of idle or light wave conditions. Controller 644 is connected to the various components so as to properly manipulate the position of the pendulum 620 in accordance with the optimum and desired energy production. The battery bank 612 and the battery charger 606 can be connected to the controller 644 so as to provide electrical energy thereto.

Figure 8:
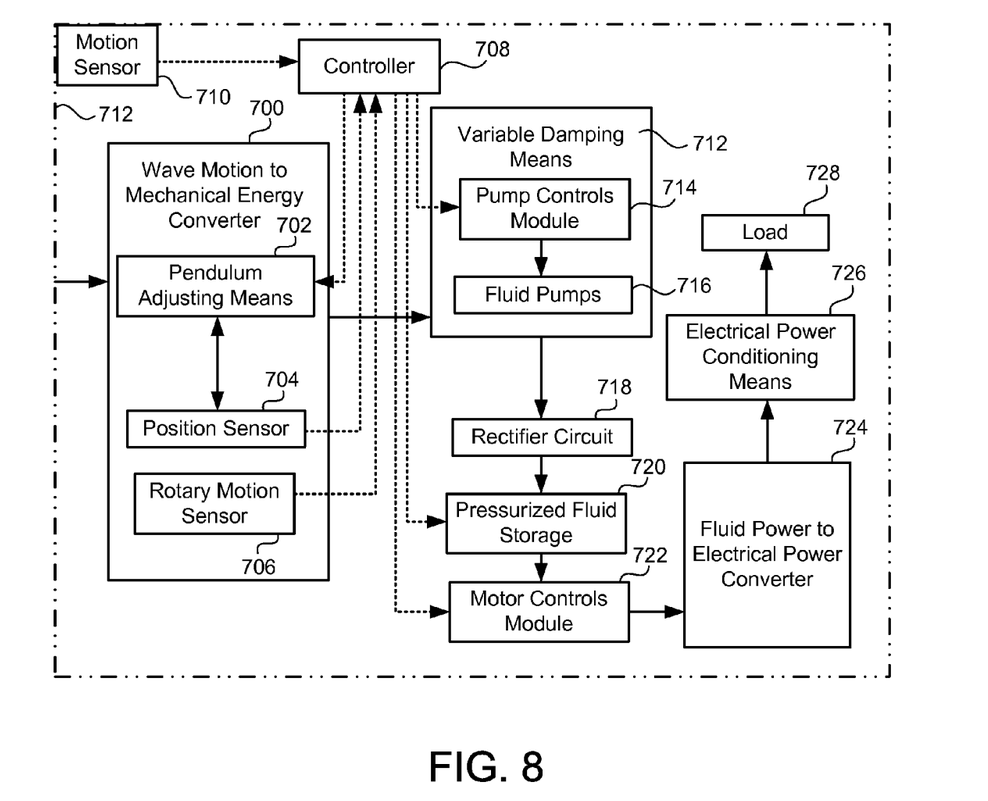
FIG. 8 is a block diagram showing the operation of the wave energy converter of the present invention.

FIG. 8 is a diagrammatic illustration of the wave energy converter of the present invention. Ultimately, the wave energy converter includes a wave motion to mechanical energy converter 700 which includes the pendulum adjusting means 702, the position sensor 704 and the rotary motion sensor 706. The position sensor 704 and the rotary motion sensor 706 serve to provide informational inputs to the controller 708. Similarly, the algorithm within the controller 708 provide an output to the pendulum adjustor 702 so as to control the center-of-mass of the pendulum. A motion sensor 710 is provided within the shell 712 so as to provide another informational input to the controller 708. It is important to note that the motion sensor 710 is not essential for the wave energy converter to achieve optimal power conversion.

The variable damping means 712 includes the pump control module 714 and the fluid pump 716. The controller 708 provides an input so as to control the pump control module. The wave motion to mechanical energy converter 700 serves to operate the variable damping means so as to produce hydraulic power therefrom. Ultimately, the fluid pump 716 passes hydraulic fluid to the rectifier circuit 718 and then onto the pressurized fluid storage 720 and further onto the motor control module 722. The controller 708 is operatively connected to the pressurized fluid storage 720 and to the motor control module 722 so as to control the operation thereof.

A fluid power-to-electrical power converter 724 receives the hydraulic energy from the motor control module 722. As such, the pressurized hydraulic fluid serves to produce electrical energy. This electrical energy can then be passed to the electrical power conditioning means 726 and then to the load 728.

Within the concept of the present invention, the pendulum or the mounting assembly can be mechanically coupled to at least one hydraulic pump. The mechanical coupling can be in the form of links, gears, rods, flanges, couplings, clutches, gearboxes, mechanical rectifiers, and the like. The hydraulics serve to provide the damping in these configurations. The use of the term "variable damping means" means that the resistance is varied and therefor, the power output capability of the wave energy converter. The hydraulics can provide damping independent of the electricity generation. However, both can be used as damping to the system. Although the various embodiments of the present invention depict linear motions pumps and rotational motion pumps coupled mechanically to the same motion from the pendulum, variations can be made wherein linear motion can be utilized so as to drive rotary motion pumps or vice-versa. The adjustment of the pendulum's can also be carried out in a wide variety of ways.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A wave energy generator comprising:
   a shell;
   a pendulum pivotally positioned in said shell;
   a variable damping means for varying a resistance to a motion of said pendulum, said variable damping means for passing hydraulic fluid in relation to the motion of said pendulum;
   an electrical generating means operatively connected to said variable damping means so as to produce electrical energy in relation to the hydraulic fluid as passed by said variable damping means;
   a rotation sensor connected between said pendulum and shell;
   a pendulum adjusting means connected to said pendulum for changing a center-of-gravity of said pendulum; and
   a controller cooperative with said rotation sensor and to said pendulum adjusting means, said controller activating said pendulum adjusting means upon receiving a signal from said rotation sensor.

2. A wave energy converter comprising:
   a shell;
   a pendulum pivotally positioned in said shell;
   a variable damping means for varying a resistance to a motion of said pendulum, said variable damping means for passing hydraulic fluid in relation to the motion of said pendulum;
   an electrical generating means operatively connected to said variable damping means so as to produce electrical energy in relation to the hydraulic fluid as passed by said variable damping means
   a position sensor connected to said pendulum so as to measure a position of said pendulum;
   a rotation sensor connected to between said pendulum and said shell; and
   a controller cooperative with said rotation sensor and to said pendulum adjusting means, said controller activating said pendulum adjusting means upon receiving a signal from said rotation sensor.

3. The wave energy converter of claim 2, further comprising:
   a hydraulic motor operatively connected to said variable damping means so as to receive the hydraulic fluid as passed by said variable damping means, said hydraulic motor drivingly connected to said electrical generating means.

4. The wave energy converter of claim 3, further comprising:
   a hydraulic rectifying means for passing the hydraulic fluid from said variable damping means in a single direction toward said hydraulic motor.

5. The wave energy converter of claim 2, further comprising:
   a pendulum adjusting means for varying a center of gravity of said pendulum.

6. The wave energy converter of claim 2, said variable damping means comprising:
   at least one pump connected to or interconnected to said pendulum so as to pass hydraulic fluid in relation to the motion of said pendulum.

7. A wave energy converter comprising:
   a shell;
   a pendulum pivotally positioned in said shell;
   a pump being operable by a movable pendulum so as to pump a hydraulic fluid outwardly therefrom;
   a motor interconnected to said pump such that the hydraulic fluid from said pump causes a rotation of said motor;
   an electrical generator connected to said motor such that the rotation of said motor causes said electrical generator to produce electrical energy; and
   a pendulum adjuster operatively connected to said pendulum so as to change a center of gravity of said pendulum, said pendulum having a shaft extending therefrom, said shaft being rotatable in relation to a motion of said pendulum, the pump comprising:
   a displacement pump cooperative with said shaft such that a rotation of said shaft causes a rotation of said displacement pump so as to cause the hydraulic fluid to be pumped therefrom.

8. The wave energy converter of claim 7, said shaft having a gear affixed thereto, said displacement pump having a gear engaged with said gear of said shaft such that a rotation of said gear of said shaft causes a corresponding rotation of said gear of said displacement pump.

9. A wave energy converter comprising:
   a shell;
   a pendulum pivotally positioned in said shell;
   a pump being operable by a movable pendulum so as to pump a hydraulic fluid outwardly therefrom;
   a motor interconnected to said pump such that the hydraulic fluid from said pump causes a rotation of said motor;
   an electrical generator connected to said motor such that the rotation of said motor causes said electrical generator to produce electrical energy;
   a pendulum adjuster operatively connected to said pendulum so as to change a center of gravity of said pendulum
   a position sensor connected to said pendulum so as to measure a position of said pendulum;
   a rotation sensor connected between said pendulum and shell; and
   a controller cooperative with said rotation sensor and to said pendulum adjuster, said controller activating said pendulum adjuster upon receiving a signal from said rotation sensor.

10. The wave energy converter of claim 9, further comprising:
    a hydraulic rectifier operatively connected to said pump so as to cause a unidirectional flow of the hydraulic fluid.

11. The wave energy converter of claim 10, further comprising:
    a pressure sensor operatively connected to said pump so as to measure of the hydraulic fluid in said pump or a pressure of said hydraulic fluid passing outwardly of said pump.

12. The wave energy converter of claim 11, said hydraulic rectifier comprising at least one controllable valve, the wave energy converter further comprising:
    another controller operatively connected to said pressure sensor and to the controllable valve so as to proportionally open or close the controllable valve relative to a pressure as sensed by said pressure sensor.

13. The wave energy converter of claim 9, said pump comprising a piston-and-cylinder assembly, said piston-and-cylinder assembly being linked to said pendulum, said pendulum moving the piston-and-cylinder assembly so as to discharge the hydraulic fluid to an outlet of the cylinder of said piston-and-cylinder assembly.

14. The wave energy converter of claim 9, said pendulum having a mounting assembly connected thereto, said pump being connected or interconnected to said mounting assembly so as to move a first portion of said pump relative to a second portion of said pump so as to discharge the hydraulic fluid through an outlet of said pump, said second portion of said pump being connected to or interconnected to said shell.

15. The wave energy converter of claim 9, further comprising:
    another controller operatively connected to said pump so as to control a quantity of hydraulic fluid displaced by said pump.

16. The wave energy converter of claim 9, said pump being a double-acting piston-and-cylinder assembly, the pump defining a first chamber and a second chamber in the cylinder of said piston-and-cylinder assembly, the wave energy converter further comprising:
    a fluid reservoir connected to an inlet of said first and second chambers so as to charge said first and second chambers with hydraulic fluid; and
    a pressurized fluid storage connected to an outlet of said first and second chambers so as to receive the discharged hydraulic fluid from said first and second chambers.

17. The wave energy converter of claim 16, said pressurized fluid storage connected to said motor so as to supply pressurized hydraulic fluid to said motor.

18. The wave energy converter of claim 9, said motor being coupled by at least one shaft to said electrical generator, the shaft having a flywheel affixed thereto.

19. The wave energy converter of claim 9, further comprising:
    a pressurized fluid supply connected to said motor so as to supply hydraulic fluid under pressure to said motor separate from or in conjunction with said pump.

* * * * *